United States Patent [19]

Suwa et al.

[11] Patent Number: 5,124,852
[45] Date of Patent: Jun. 23, 1992

[54] MAGNETIC TAPE RECORDING APPARATUS

[75] Inventors: Tetsuya Suwa, Yokohama; Hiroshi Nishiumi, Kawasaki; Seiji Higurashi, Tokyo, all of Japan

[73] Assignee: Victor Company of Japan, Ltd., Yokohama, Japan

[21] Appl. No.: 603,498

[22] Filed: Oct. 26, 1990

[30] Foreign Application Priority Data

Nov. 10, 1989 [JP] Japan .................................. 1-292569
Dec. 26, 1989 [JP] Japan .................................. 1-337529

[51] Int. Cl.$^5$ .............................................. G11B 5/09
[52] U.S. Cl. ..................................... 360/66; 360/19.1
[58] Field of Search ..................... 360/29, 19.1, 20, 66

[56] References Cited

FOREIGN PATENT DOCUMENTS 0277000  8/1988  European Pat. Off. .
1105301  4/1989  Japan .
1105302  4/1989  Japan .

Primary Examiner—Vincent P. Canney
Attorney, Agent, or Firm—Lowe, Price, LeBlanc & Becker

[57] ABSTRACT

A digital audio signal is subjected to predetermined modulation using a predetermined carrier, and thereby the digital audio signal is converted into a modulated digital audio signal. An FM audio signal is generated. The modulated digital audio signal and the FM audio signal are combined into a composite audio signal. The composite audio signal is superimposed on a high-frequency bias signal, and thereby the composite audio signal is converted into a final modulated audio signal. The final modulated audio signal is recorded into a magnetic tape. A predetermined basic signal is generated. The predetermined carrier and the bias signal are generated from the basic signal. The predetermined carrier and the bias signal have a predetermined frequency relation which is chosen in dependence upon a frequency of beats caused by cross modulation between the modulated digital audio signal and the bias signal.

4 Claims, 4 Drawing Sheets

MAGNETIC TAPE RECORDING APPARATUS

BACKGROUND OF THE INVENTION

This invention relates to a magnetic tape recording apparatus such as a VTR in which an FM audio signal and a PCM audio signal are mixed and the resultant audio signal mixture is recorded into a deep portion of a magnetic tape, and then a video signal is recorded over the record of the audio signal mixture.

In some magnetic tape recording apparatuses and VTRs, an FM audio signal and a PCM audio signal are mixed and the resultant audio signal mixture is recorded into a deep portion of a magnetic tape, and then a video signal is recorded over the record of the audio signal mixture.

Japanese published unexamined patent application 1-105301 discloses such a VTR. In the VTR of Japanese application 1-105301, a PCM audio signal undergoes OQDPSK (Off-set Quadrature Differential Phase Shift Keying) modulation before being mixed with an FM audio signal. A mixture of the FM audio signal and the PCM audio signal is superimposed on a high-frequency bias signal, resulting in a final modulated composite audio signal which is recorded into a deep portion of a magnetic tape. Then, a video signal is recorded over the record of the final modulated composite audio signal.

In the VTR of Japanese application 1-105301, during a playback mode of operation of the VTR, cross modulation between the OQDPSK signal and the bias signal causes beats between the two signals which contain a so-called fifth-order distortion having a line spectrum. When the frequency of the cross modulation distortion is near or within the frequency band of the PCM audio signal, the FM audio signal, or a color component of the video signal, the distortion interferes with the latter signal and lowers the quality of the signal at a playback stage.

SUMMARY OF THE INVENTION

It is an object of this invention to provide an improved magnetic tape recording apparatus.

A first aspect of this invention provides a magnetic tape recording apparatus comprising means for subjecting a digital audio signal to predetermined modulation using a predetermined carrier and thereby converting the digital audio signal into a modulated digital audio signal, means for generating an FM audio signal, means for mixing the modulated digital audio signal and the FM audio signal into a composite audio signal, means for superimposing the composite audio signal on a high-frequency bias signal and thereby converting the composite audio signal into a final modulated audio signal, and means for recording the final modulated audio signal into a magnetic tape; the improvement comprising first generating means for generating a predetermined basic signal; and second generating means for generating the predetermined carrier and the bias signal from the basic signal; wherein the predetermined carrier and the bias signal have a predetermined frequency relation which is chosen in dependence upon a frequency of beats caused by cross modulation between the modulated digital audio signal and the bias signal.

A second aspect of this invention provides a magnetic tape recording apparatus comprising means for subjecting a digital audio signal to predetermined modulation using a predetermined carrier and thereby converting the digital audio signal into a modulated digital audio signal, means for generating an FM audio signal, means for mixing the modulated digital audio signal and the FM audio signal into a composite audio signal, means for superimposing the composite audio signal on a high-frequency bias signal and thereby converting the composite audio signal into a final modulated audio signal, and means for recording the final modulated audio signal into a magnetic tape; the improvement wherein a frequency of the bias signal is chosen to be a predetermined value at which a frequency of beats caused by cross modulation between the modulated digital audio signal and the bias signal lies outside frequency bands of the modulated digital audio signal and the FM audio signal.

DESCRIPTION OF THE FIRST PREFERRED EMBODIMENT

Figure 1:
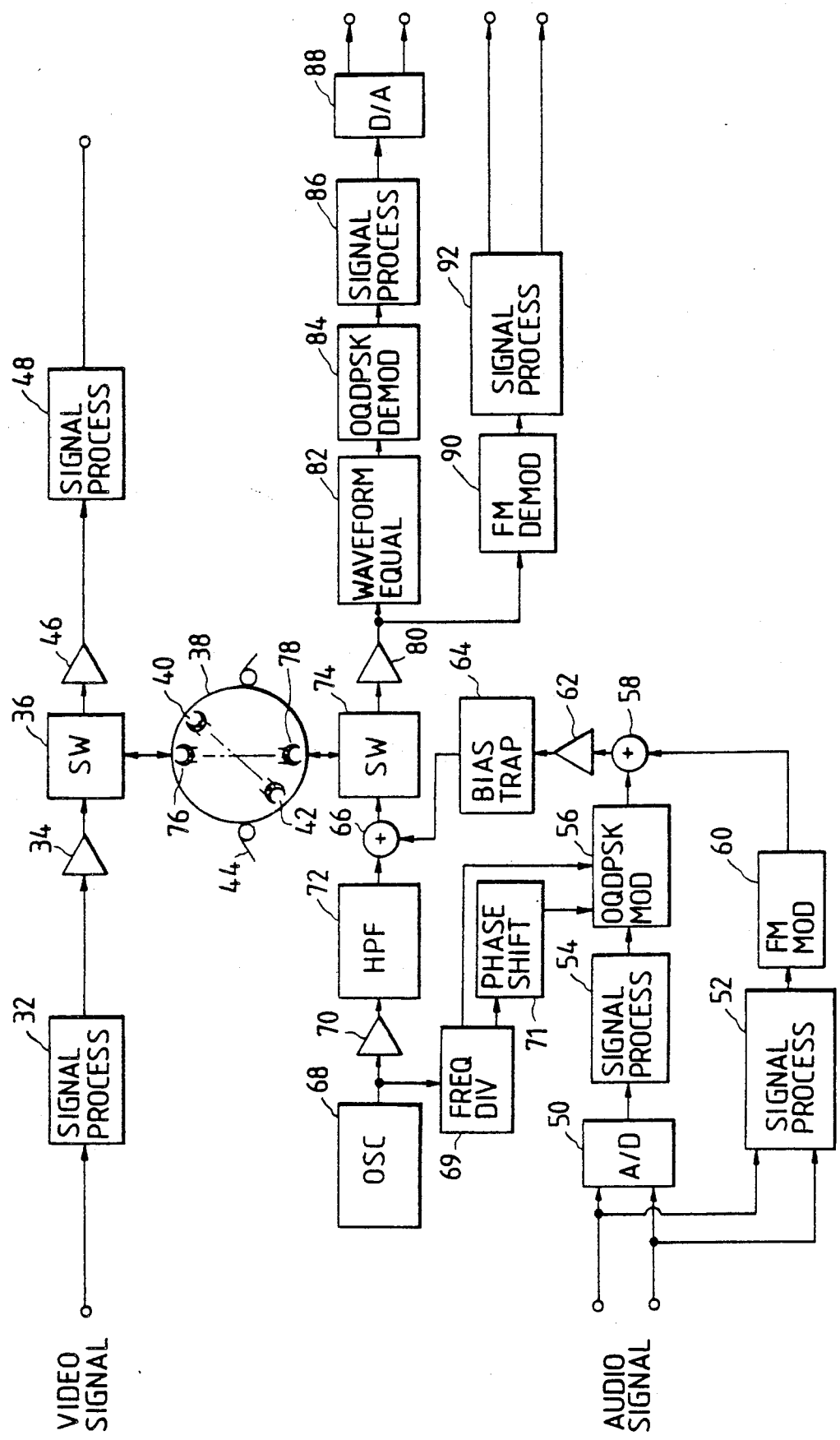
FIG. 1 is a block diagram of an apparatus according to a first embodiment of this invention.

With reference to FIG. 1, a magnetic tape recording and reproducing apparatus is basically divided into a recording side and a reproducing side which are illustrated in a left-hand part and a right-hand part of the drawing respectively.

During a recording mode of operation of the apparatus, a color video signal to be recorded is inputted into a video signal processing circuit 32 of the recording side. The color video signal is subjected to predetermined signal processing by the video signal processing circuit 32. The output video signal from the video signal processing circuit 32 is fed to a switch 36 via a recording amplifier 34. During the recording mode, the switch 36 transmits the video signal to video heads 40 and 42 via which the video signal is recorded on a magnetic tape 44. As will be described later, the video signal is recorded over the record of an audio-information signal.

During the recording mode of operation of the apparatus, an analog audio signal to be recorded is inputted into an A/D converter 50 and an audio signal processing circuit 52. The analog audio signal is converted by the A/D converter 50 into a corresponding digital audio signal which is fed to a digital signal processing circuit 54. The digital audio signal is subjected by the digital signal processing circuit 54 to predetermined signal processing such as PCM encoding and time base compressing. The output digital audio signal from the digital signal processing circuit 54 is fed to an OQDPSK modulator 56. The digital audio signal is subjected to OQDPSK modulation by the OQDPSK modulator 56. The output OQDPSK signal from the OQDPSK modulator 56 is applied to a first input terminal of an adder 58.

The analog audio signal is processed by the audio signal processing circuit 52. The output analog audio signal from the audio signal processing circuit 52 is fed to an FM modulator 60. The analog audio signal is subjected to FM modulation by the FM modulator 60. The output FM signal from the FM modulator 60 is applied to a second input terminal of the adder 58.

The adder 58 mixes the OQDPSK signal and the FM signal and combines them into a composite audio-information signal. The composite audio-information signal is transmitted to a first input terminal of an adder 66 via a recording amplifier 62 and a bias trap circuit 64.

An oscillator 68 outputs a high-frequency bias signal. The bias signal is transmitted from the oscillator 68 to a second input terminal of the adder 66 via an amplifier 70 and a high pass filter 72.

The adder 66 mixes the composite audio-information signal and the bias signal and combines them into a final modulated audio-information signal which is applied to a switch 74. During the recording mode, the switch 74 transmits the final modulated audio-information signal to audio heads 76 and 78 via which the final modulated audio-information signal is recorded on the magnetic tape 44. Specifically, the audio-information signal is recorded into a deep portion of the magnetic tape 44 before the corresponding video signal is recorded into a surface portion of the magnetic tape 44 which extends over the audio-recording deep portion of the magnetic tape 44. In other words, the video signal is recorded over the record of the audio-information signal.

The bias signal outputted from the oscillator 68 is also fed to a ¼ frequency divider 69. The frequency divider 69 divides the frequency of the bias signal by four. The output signal from the frequency divider 69 is fed to the OQDPSK modulator 56. In addition, the output signal from the frequency divider 69 is applied to a phase shifter 71. The phase shifter 71 shifts the output signal of the frequency divider 69 by 90 degrees or $\pi/2$. The output signal from the phase shifter 71 which has a quadrature relation with the output signal from the frequency divider 69 is fed to the OQDPSK modulator 56. In this way, a pair of the quadrature signals is fed to the OQDPSK modulator 56. The pair of the quadrature signals is used by the OQDPSK modulator 56 as a pair of OQDPSK modulation carriers.

During a playback mode of operation of the apparatus, a video signal is reproduced from the magnetic tape 44 via the video heads 40 and 42, and the reproduced video signal is outputted from the video heads 40 and 42 to the switch 36. During the playback mode, the switch 36 transmits the reproduced video signal to a reproducing amplifier 46. The reproduced video signal is amplified by the reproducing amplifier 46, being fed to a video signal processing circuit 48 of the reproducing side. The video signal processing circuit 48 recovers an original video signal from the reproduced video signal by executing predetermined signal processing.

During the playback mode of operation of the apparatus, an audio-information signal is reproduced from the magnetic tape 44 via the audio heads 76 and 78, and the reproduced audio-information signal is outputted from the audio heads 76 and 78 to the switch 74. During the playback mode, the switch 74 transmits the reproduced audio-information signal to a reproducing amplifier 80. The reproduced audio-information signal is amplified by the reproducing amplifier 80, being fed to a wave-form equalizing circuit 82 and an FM demodulator 90.

The reproduced audio-information signal is subjected to wave-form equalization by the wave-form equalizing circuit 82. The output signal from the wave-form equalizing circuit 82 is applied to an OQDPSK demodulator 84, being subjected to OQDPSK demodulation by the OQDPSK demodulator 84. The output signal from the OQDPSK demodulator 84 is fed to a digital signal processing circuit 86, being subjected by the digital signal processing circuit 86 to predetermined signal processing such as PCM decoding and time base expanding. The output signal from the digital signal processing circuit 86 is fed to a D/A converter 88, being converted by the D/A converter 88 back into an original analog audio signal.

The reproduced audio-information signal is subjected to FM demodulation by the FM demodulator 90. The output signal from the FM demodulator 90 is fed to an audio signal processing circuit 92, being converted by the audio signal processing circuit 92 back into an original audio signal.

Figure 2:
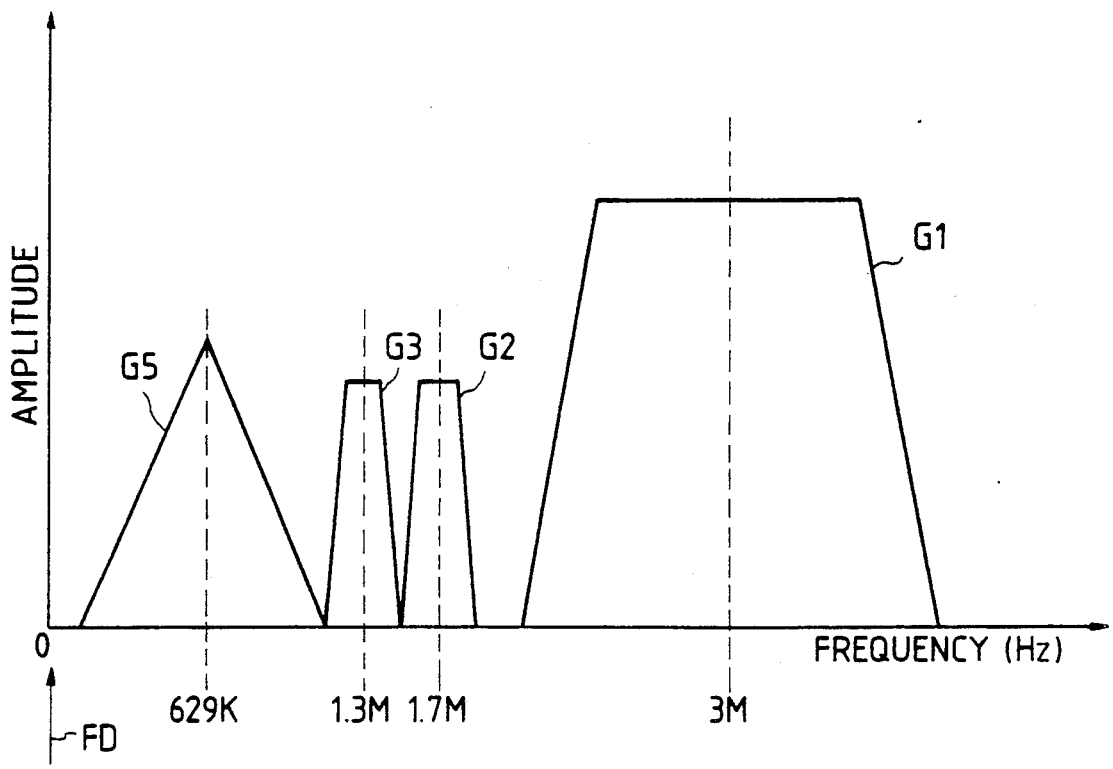
FIG. 2 is a diagram showing the frequency spectrums of various signals in the apparatus of FIG. 1.

The analog audio signal to be FM-modulated has a right-channel part and a left-channel part. Accordingly, the output FM signal from the FM modulator 60 also has a right-channel part and a left-channel part. As shown in FIG. 2, the frequencies of FM modulation carriers of the right channel and the left channel are set to 1.7 MHz and 1.3 MHz respectively, and the right-channel part and the left-channel part of the FM signal have spectrums G2 and G3 respectively. The maximum frequency deviations of the right-channel and the left-channel of the FM signal are represented as fAL±150 kHz and fAR±150 kHz respectively, where fAL denotes the left-channel FM carrier frequency and the fAR denotes the right-channel FM carrier frequency.

The frequency of the bias signal from the oscillator 68 is set to 12 MHz so that the carrier frequency of the OQDPSK signal from the OQDPSK modulator 56 is equal to 3 MHz due to the function of the ¼ frequency divider 69. As shown in FIG. 2, the OQDPSK signal has a spectrum G1 centered at 3 MHz.

As shown in FIG. 2, the color signal carrier frequency of the output video signal from the video signal processing circuit 32 is set to 629 KHz, and the color component of the video signal has a spectrum G5 centered at 629 kHz.

During the playback mode of operation of the apparatus, cross modulation between the bias signal and the OQDPSK signal causes beats between the two signals. Here, the beats correspond to various mixtures of the bias signal, the OQDPSK signal, harmonics of the bias signal, and harmonics of the OQDPSK signal. The beats contain a so-called fifth-order distortion of a line spectrum whose frequency is equal to $|4fP-fB|$, where fP denotes the OQDPSK signal carrier frequency and fB denotes the bias signal frequency. Since the bias signal frequency fB equals four times the OQDPSK signal carrier frequency fP as understood from the previous description, the frequency of the fifth-order distortion is equal to 0 MHz as denoted by FD in FIG. 2. Therefore, the frequency of the fifth-order distortion sufficiently separates from the frequencies of the FM signal, the OQDPSK signal, and the color signal so that the fifth-order distortion is prevented from interfering with these signals.

Since the OQDPSK signal carrier originates from the bias signal, the OQDPSK signal carrier frequency remains equal to one fourth of the bias signal frequency even when the bias signal frequency fluctuates due to a temperature variation. Thus, the frequency of the fifth-order distortion also remains equal to 0 MHz and the fifth-order distortion keeps prevented from interfering with the color signal and the audio-information signals under such a temperature variation.

It should be noted that various modifications may be made in this embodiment. For example, if an N-order distortion caused by cross modulation is dominant where N denotes an odd number other than five, the frequency divider 69 is modified to execute $1/(N-1)$ frequency division to make the N-order distortion frequency equal to 0 MHz.

DESCRIPTION OF THE SECOND PREFERRED EMBODIMENT

A second embodiment of this invention is similar to the embodiment of FIGS. 1 and 2 except for the following design changes. In the second embodiment, the frequencies of the FM modulation carriers of the right channel and the left channel are set to 1.8 MHz and 1.4 MHz respectively, and the frequency of the bias signal is set to 12.4 MHz so that the carrier frequency of the OQDPSK signal is equal to 3.1 MHz due to the function of the $\frac{1}{4}$ frequency divider 69.

The frequency of the fifth-order distortion is equal to 0 MHz as in the embodiment of FIGS. 1 and 2, so that the second embodiment has advantages similar to the advantages of the embodiment of FIGS. 1 and 2.

DESCRIPTION OF THE THIRD PREFERRED EMBODIMENT

Figure 3:
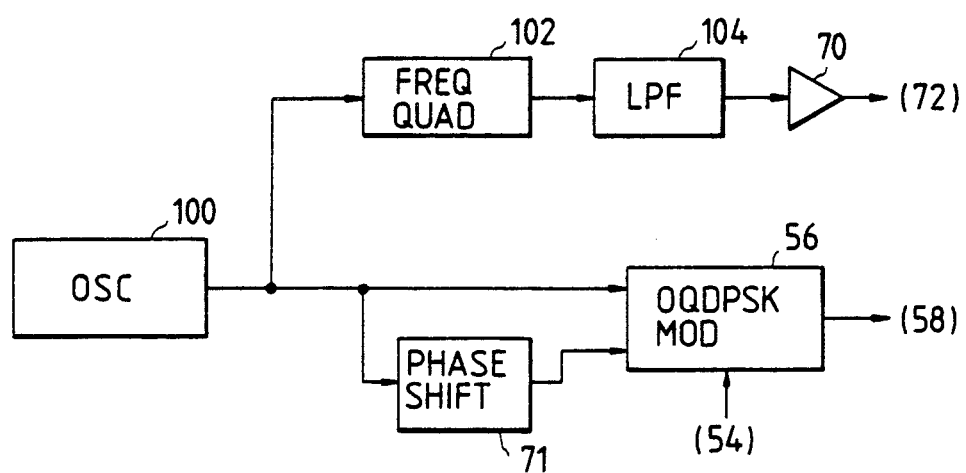
FIG. 3 is a block diagram of a part of an apparatus according to a third embodiment of this invention.

FIG. 3 shows a third embodiment of this invention which is similar to the embodiment of FIGS. 1 and 2 except for the following design changes. In the embodiment of FIG. 3, the output signal from an oscillator 100 is fed to the OQDPSK modulator 56. In addition, the output signal from the oscillator 100 is applied to the phase shifter 71. The phase shifter 71 shifts the phase of the output signal from the oscillator 100 by 90 degrees or $\pi/2$. The output signal from the phase shifter 71 is fed to the OQDPSK modulator 56. In this way, a pair of the quadrature signals is fed to the OQDPSK modulator 56. The pair of the quadrature signals is used by the OQDPSK modulator 56 as a pair of OQDPSK modulation carriers.

Furthermore, the output signal from the oscillator 100 is fed to a frequency quadrupling device 102. The frequency quadrupling device 102 multiplies the frequency of the output signal from the oscillator 100 by four, converting the output signal from the oscillator 100 into a high-frequency bias signal. The bias signal, that is, the output signal from the frequency quadrupling device 102, is fed to the amplifier 70 via a low pass filter 104.

Since the bias signal frequency equals four times the OQDPSK signal carrier frequency as understood from the previous description, the frequency of the fifth-order distortion is equal to 0 MHz as in the embodiment of FIGS. 1 and 2. Therefore, the embodiment of FIG. 3 has advantages similar to the advantages of the embodiment of FIGS. 1 and 2.

DESCRIPTION OF THE FOURTH PREFERRED EMBODIMENT

Figure 4:
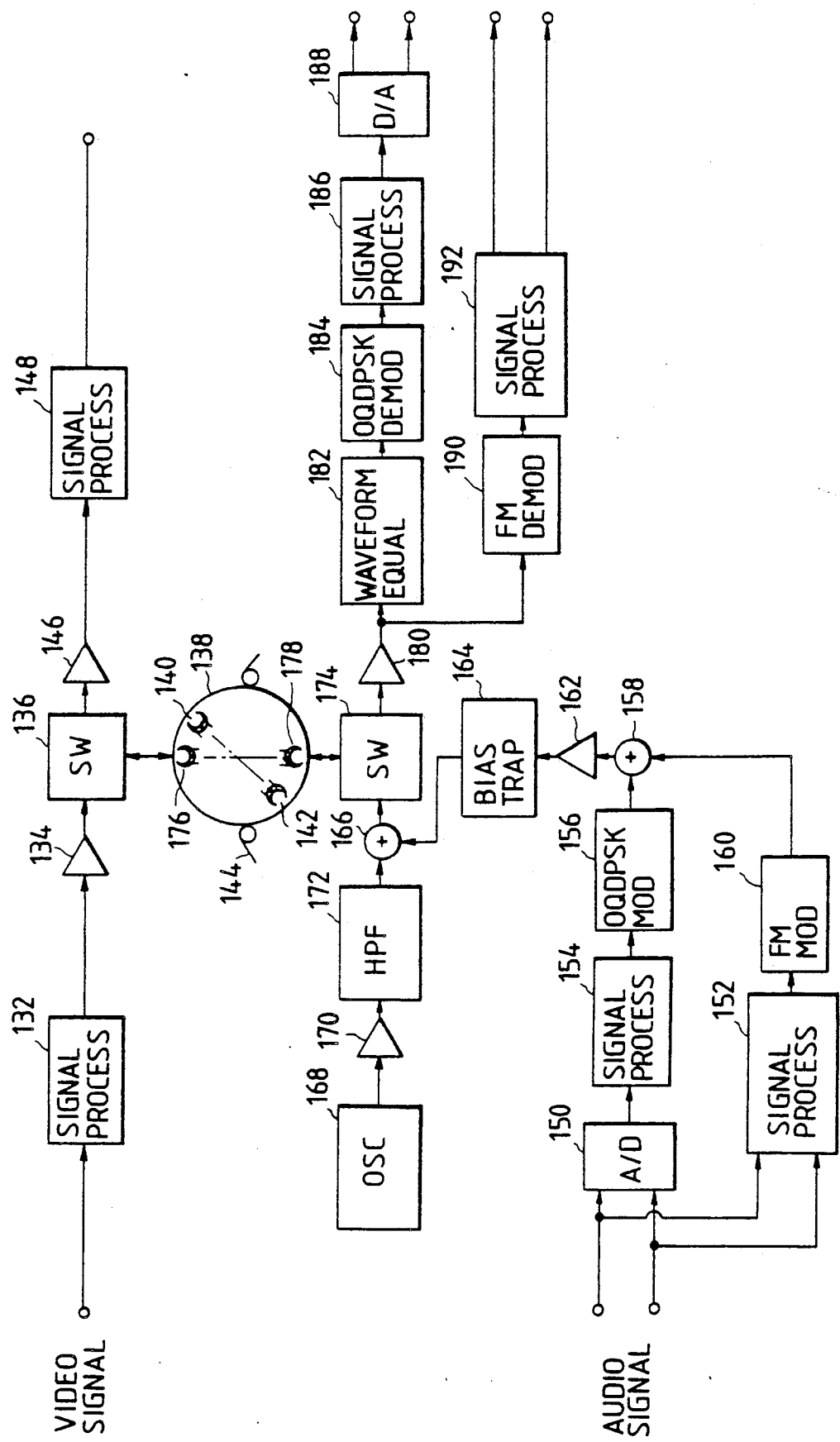
FIG. 4 is a block diagram of an apparatus according to a fourth embodiment of this invention.

With reference to FIG. 4, a magnetic tape recording and reproducing apparatus is basically divided into a recording side and a reproducing side which are illustrated in a left-hand part and a right-hand part of the drawing respectively.

During a recording mode of operation of the apparatus, a color video signal to be recorded is inputted into a video signal processing circuit 132 of the recording side. The color video signal is subjected to predetermined signal processing by the video signal processing circuit 132. The output video signal from the video signal processing circuit 132 is fed to a switch 136 via a recording amplifier 134. During the recording mode, the switch 136 transmits the video signal to video heads 140 and 142 via which the video signal is recorded on a magnetic tape 144. As will be described later, the video signal is recorded over the record of an audio-information signal.

During the recording mode of operation of the apparatus, an analog audio signal to be recorded is inputted into an A/D converter 150 and an audio signal processing circuit 152. The analog audio signal is converted by the A/D converter 150 into a corresponding digital audio signal which is fed to a digital signal processing circuit 154. The digital audio signal is subjected by the digital signal processing circuit 154 to predetermined signal processing such as PCM encoding and time base compressing. The output digital audio signal from the digital signal processing circuit 154 is fed to an OQDPSK modulator 156. The digital audio signal is subjected to OQDPSK modulation by the OQDPSK modulator 156 is applied to a first input terminal of an adder 158.

The analog audio signal is processed by the audio signal processing circuit 152. The output analog audio signal from the audio signal processing circuit 152 is fed to an FM modulator 160. The analog audio signal is subjected to FM modulation by the FM modulator 160. The output FM signal from the FM modulator 160 is applied to a second input terminal of the adder 158.

The adder 158 mixes the OQDPSK signal and the FM signal and combines them into a composite audio-information signal. The composite audio-information signal is transmitted to a first input terminal of an adder 166 via a recording amplifier 162 and a bias trap circuit 164.

An oscillator 168 outputs a high-frequency bias signal. As will be described later, the bias signal has a predetermined frequency which is chosen in view of distortion by cross modulation. The bias signal is transmitted from the oscillator 168 to a second input terminal of the adder 166 via an amplifier 170 and a high pass filter 172.

The adder 166 mixes the composite audio-information signal and the bias signal and combines them into a final modulated audio-information signal which is applied to a switch 174. During the recording mode, the switch 174 transmits the final modulated audio-information signal to audio heads 176 and 178 via which the final modulated audio-information signal is recorded on the magnetic tape 144. Specifically, the audio-information signal is recorded into a deep portion of the magnetic tape 144 before the corresponding video signal is recorded into a surface portion of the magnetic tape 144 which extends over the audio-recording deep portion of the magnetic tape 144. In other words, the video signal is recorded over the record of the audio-information signal.

During a playback mode of operation of the apparatus, a video signal is reproduced from the magnetic tape 144 via the video heads 140 and 142, and the reproduced video signal is outputted from the video heads 140 and 142 to the switch 136. During the playback mode, the switch 136 transmits the reproduced video signal to a reproducing amplifier 146. The reproduced video signal is amplified by the reproducing amplifier 146, being fed to a video signal processing circuit 148 of the reproducing side. The video signal processing circuit 148 recovers an original video signal from the reproduced video signal by executing predetermined signal processing.

During the playback mode of operation of the apparatus, an audio-information signal is reproduced from the magnetic tape 144 via the audio heads 176 and 178, and the reproduced audio-information signal is outputted from the audio heads 176 and 178 to the switch 174. During the playback mode, the switch 174 transmits the reproduced audio-information signal to a reproducing amplifier 180. The reproduced audio-information signal is amplified by the reproducing amplifier 180, being fed to a wave-form equalizing circuit 182 and an FM demodulator 190.

The reproduced audio-information signal is subjected to wave-form equalization by the wave-form equalizing circuit 182. The output signal from the wave-form equalizing circuit 182 is applied to an OQDPSK demodulator 184, being subjected to OQDPSK demodulation by the OQDPSK demodulator 184. The output signal from the OQDPSK demodulator 184 is fed to a digital signal processing circuit 186, being subjected by the digital signal processing circuit 186 to predetermined signal processing such as PCM decoding and time base expanding. The output signal from the digital signal processing circuit 186 is fed to a D/A converter 188, being converted by the D/A converter 188 back into an original analog audio signal.

The reproduced audio-information signal is subjected to FM demodulation by the FM demodulator 190. The output signal from the FM demodulator 190 is fed to an audio signal processing circuit 192, being converted by the audio signal processing circuit 192 back into an original audio signal.

Figure 5:
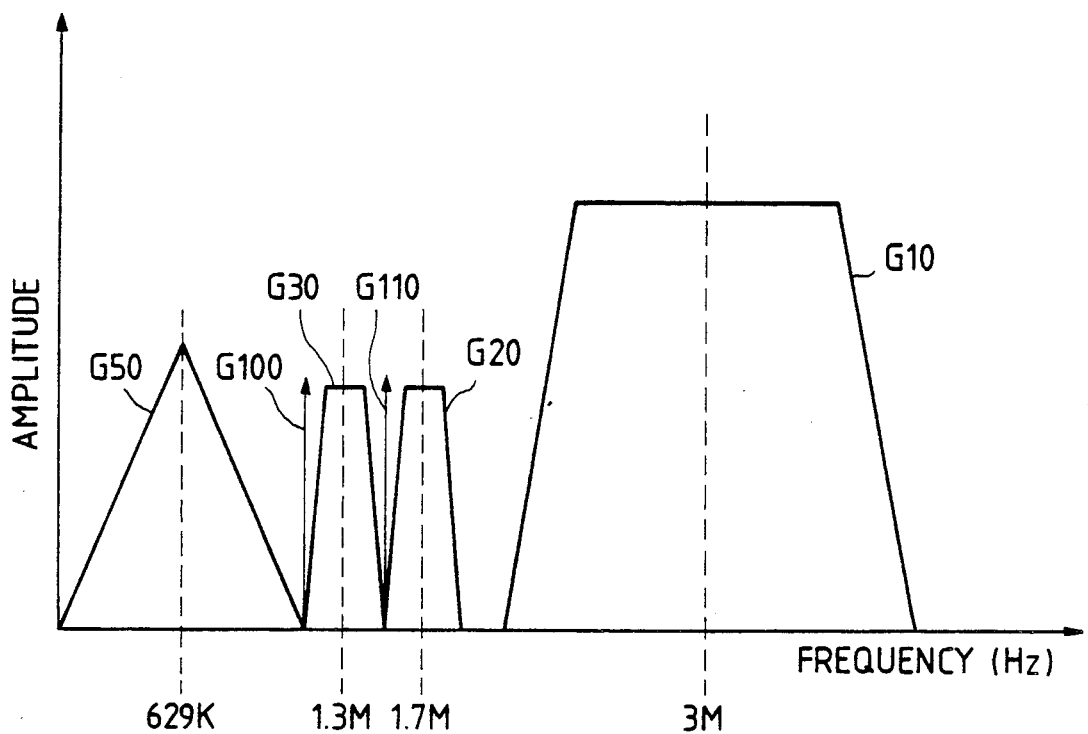
FIG. 5 is a diagram showing the frequency spectrums of various signals in the apparatus of FIG. 4.

The analog audio signal to be FM-modulated has a right-channel part and a left-channel part. Accordingly, the output FM signal from the FM modulator 160 also has a right-channel part and a left-channel part. As shown in FIG. 5, the frequencies of FM modulation carriers of the right channel and the left channel are set to 1.7 MHz and 1.3 MHz respectively, and the right-channel part and the left-channel part of the FM signal have spectrums G20 and G30 respectively. The maximum frequency deviations of the right-channel and the left-channel of the FM signal are represented as fAL±150 kHz and fAR±150 kHz respectively, where fAL denotes the left-channel FM carrier frequency and the fAR denotes the right-channel FM carrier frequency.

The OQDPSK modulator 156 includes an oscillator generating a pair of quadrature carriers which are modulated with the audio information fed from the digital signal processing circuit 154. The frequency of the OQDPSK carriers is set to 3 MHz. The frequency band of the OQDPSK modulated signal from the OQDPSK modulator 156 is set as fP±1 MHz where fP denotes the OQDPSK carrier frequency. Therefore, as shown in FIG. 5, the OQDPSK signal has a spectrum G10 centered at 3 MHz.

As shown in FIG. 5, the color signal carrier frequency of the output video signal from the video signal processing circuit 132 is set to 629 kHz, and the color component of the video signal has a spectrum G50 centered at 629 KHz.

During the playback mode of operation of the apparatus, cross modulation between the bias signal and the OQDPSK signal causes a fifth-order distortion of a line spectrum whose frequency is equal to $|4fP-fB|$, where fP denotes the OQDPSK signal carrier frequency and fB denotes the bias signal frequency. The bias signal frequency fB is chosen so that the frequency of the fifth-order distortion will lie outside the frequency bands of the FM signal, the OQDPSK signal, and the color component of the video signal.

Specifically, the bias signal frequency fB is set within one of the following four ranges (1), (2), (3), and (4).

$$fB = 11 \text{ MHz} \pm 150 \text{ kHz} \tag{1}$$

$$fB = 10.5 \text{ MHz} \pm 50 \text{ kHz} \tag{2}$$

$$fB = 13 \text{ MHz} \pm 150 \text{ kHz} \tag{3}$$

$$fB = 13.5 \text{ MHz} \pm 50 \text{ kHz} \tag{4}$$

When the bias signal frequency is set within the ranges (1), (2), (3), and (4), the frequency fD of the fifth-order distortion lies in the following ranges (5), (6), (7), and (8) respectively.

$$fD = 1 \text{ MHz} \pm 150 \text{ kHz} \tag{5}$$

$$fD = 1.5 \text{ MHz} \pm 50 \text{ kHz} \tag{6}$$

$$fD = 1 \text{ MHz} \pm 150 \text{ kHz} \tag{7}$$

$$fD = 1.5 \text{ MHz} \pm 50 \text{ kHz} \tag{8}$$

As shown in FIG. 5, the frequency ranges (5) and (7) of the fifth-order distortion are located at a position G100 outside the frequency bands of the FM signal, the OQDPSK signal, and the color component of the video signal. In addition, the frequency ranges (6) and (8) of the fifth-order distortion are located at a position G110 outside the frequency bands of the FM signal, the OQDPSK signal, and the color component of the video signal.

This frequency relation between the fifth-order distortion and the audio and video information signals enables the fifth-order distortion to be prevented from interfering with the audio and video information signals.

It should be noted that various modifications may be made in this embodiment. For example, the bias signal frequency fB may be set higher than 16 MHz. In this case, the frequency fD of the fifth-order distortion is higher than 4 MHz which extends outside the frequency bands of the FM signal, the OQDPSK signal, and the color component of the video signal.

DESCRIPTION OF THE FIFTH PREFERRED EMBODIMENT

A fifth embodiment of this invention is similar to the embodiment of FIGS. 4 and 5 except for the following design changes. In the fifth embodiment, the frequencies of FM modulation carriers of the right channel and the left channel are set to 1.8 MHz and 1.4 MHz respectively, and the carrier frequency of the OQDPSK signal is set to 3.1 MHz.

The bias signal frequency fB is set within one of the following four ranges (11), (12), (13), and (14).

$$fB = 11.3 \text{ MHz} \pm 150 \text{ kHz} \tag{11}$$

$$fB = 10.8 \text{ MHz} \pm 150 \text{ kHz} \tag{12}$$

$$fB = 13.6 \text{ MHz} \pm 150 \text{ kHz} \quad (13)$$

$$fB = 14 \text{ MHz} \pm 50 \text{ kHz} \quad (14)$$

When the bias signal frequency is set within the ranges (11), (12), (13), and (14), the frequency fD of the fifth-order distortion lies in the following ranges (15), (16), (17), and (18) respectively.

$$fD = 1.1 \text{ MHz} \pm 150 \text{ kHz} \quad (15)$$

$$fD = 1.6 \text{ MHz} \pm 50 \text{ kHz} \quad (16)$$

$$fD = 1.1 \text{ MHz} \pm 150 \text{ kHz} \quad (17)$$

$$fD = 1.6 \text{ MHz} \pm 50 \text{ kHz} \quad (18)$$

As in the embodiment of FIGS. 4 and 5, the frequency ranges (15), (16), (7), and (18) of the fifth-order distortion are located at positions outside the frequency bands of the FM signal, the OQDPSK signal, and the color component of the video signal. Therefore, the fifth-order distortion is prevented from interfering with the audio and video information signals.

It should be noted that various modifications may be made in this embodiment. For example, the bias signal frequency fB may be set higher than 16.5 MHz. In this case, the frequency fD of the fifth-order distortion is higher than 4.1 MHz which extends outside the frequency bands of the FM signal, the OQDPSK signal, and the color component of the video signal.

What is claimed is:

1. A magnetic tape recording apparatus comprising means for subjecting a digital audio signal to predetermined modulation using a predetermined carrier and thereby converting the digital audio signal into a modulated digital audio signal, means for generating an FM audio signal, means for mixing the modulated digital audio signal and the FM audio signal into a composite audio signal, means for superimposing the composite audio signal on a high-frequency bias signal and thereby converting the composite audio signal into a final modulated audio signal, and means for recording the final modulated audio signal into a magnetic tape;

the improvement comprising:
first generating means for generating a predetermined basic signal; and
second generating means for generating the predetermined carrier and the bias signal from the basic signal;
wherein the predetermined carrier and the bias signal have a predetermined frequency relation which is chosen in dependence upon a frequency of beats caused by cross modulation between the modulated digital audio signal and the bias signal.

2. The magnetic tape recording apparatus of claim 1 wherein the second generating means comprises means for directly using the basic signal as the bias signal, and means for dividing the frequency of the basic signal and converting the basic signal into the predetermined carrier.

3. The magnetic tape recording apparatus of claim 1 wherein the second generating means comprises means for directly using the basic signal as the predetermined carrier, and means for multiplying the frequency of the basic signal and converting the basic signal into the bias signal.

4. A magnetic tape recording apparatus comprising means for subjecting a digital audio signal to predetermined modulation using a predetermined carrier and thereby converting the digital audio signal into a modulated digital audio signal, means for generating an FM audio signal, means for mixing the modulated digital audio signal and the FM audio signal into a composite audio signal, means for superimposing the composite audio signal on a high-frequency bias signal and thereby converting the composite audio signal into a final modulated audio signal, and means for recording the final modulated audio signal into a magnetic tape;

the improvement wherein a frequency of the bias signal is chosen to be a predetermined value at which a frequency of beats caused by cross modulation between the modulated digital audio signal and the bias signal lies outside frequency bands of the modulated digital audio signal and the FM audio signal.

* * * * *